United States Patent [19]

Isa et al.

[11] 4,031,158

[45] June 21, 1977

[54] METHOD FOR PREPARATION OF POLYOLEFIN OIL

[75] Inventors: Hiroshi Isa; Toshiyuki Ukigai, both of Yachiyo; Anri Tominaga, Tokyo; Ryozo Taniyasu, Narashino; Masuzo Nagayama, Tokyo, all of Japan

[73] Assignee: Lion Fat & Oil Co., Ltd., Tokyo, Japan

[22] Filed: July 22, 1976

[21] Appl. No.: 707,614

[30] Foreign Application Priority Data

July 29, 1975 Japan .............................. 50-92198

[52] U.S. Cl. ...................................... 260/683.15 B
[51] Int. Cl.² .......................................... C07C 3/18
[58] Field of Search ........................... 260/683.15 B

[56] References Cited

UNITED STATES PATENTS 3,952,071    4/1976    Isa et al. ................... 260/683.15 B

*Primary Examiner*—C. Davis
*Attorney, Agent, or Firm*—Woodhams, Blanchard and Flynn

[57] ABSTRACT

A method of preparing a polyolefin oil in the present invention comprises polymerizing an olefin having 6 or more carbon atoms in the presence of a mixture of a polyhydric alcohol derivative and an aluminum halide, said derivative being obtained by replacing hydrogen atoms of all the hydroxyl groups of the polyhydric alcohol by alkyl groups having 1–20 carbon atoms. The thus prepared polyolefin oil scarcely contains halogen, and it has a wide range of use such as, for instance, a lubricant, a cosmetic base, a textile finishing agent, etc.

6 Claims, No Drawings

METHOD FOR PREPARATION OF POLYOLEFIN OIL

BACKGROUND OF THE INVENTION

The present invention relates to a method for preparation of polyolefin oils, and particularly relates to a method for preparation of polyolefin oils by employing a mixture of ether derived from polyhydric alcohol and aluminum halide as polymerization catalysts, which can perfectly prevent halogen from being present in the polymerization product and provide polyolefin oils of high viscosity index at a high yield.

The art of employing Lewis acid such as aluminum chloride as catalyst in effecting polymerization of olefins has been known for log. However, the conventional Lewis acid catalysts have been defective in that, inasmuch as they are soluble in olefins, it is not easy to separate the catalyst at the time of completing the reaction, and even if the catalyst is separated and removed by the use of an aqueous solution of caustic alkali, an aqueous ammonia or an adsorbent, it is quite difficult to reuse the thus recovered catalyst for the purpose of polymerizing olefins.

Japanese Pat. Publication No. 9657/1967 discloses a method of polymerizing olefins which comprises effecting polymerization of an olefin-type unsaturated compound capable of cationic polymerization by employing a catalyst consisting of non-volatile residue obtained through thermal cracking of a compound to be expressed by the general formula $AlX_3 (R_2O)_n$ [wherein X represents halogen, R represents aliphatic or aromatic hydrocarbon radical and n is an integer of 1 or more]. Hoever, in the case of polymerizing olefins having 6 or more carbon atoms by this method, not only the reaction temperature is required to be 150° C or more, but also the yield is low. Besides, the resulting polyolefin oil is defective in that it contains much halogen mixed therein and the viscosity index thereof is low.

Japanese Pat. Publication No. 3804/1969 discloses a method of polymerizing olefins in the presence of a catalyst prepared by dissolving excess aluminum halide in a complex consisting of aluminum halide and ethyl acetate at the molar ratio of 1:1. However, as the foregoing complex consisting of aluminum halide and ethyl acetate can act as no more than a solvent for dissolving aluminum halide, separation of the catalyst from the reaction product after completing the reaction is difficult like in the case of employing aluminum halide independently, and moreover it is necessary to add aluminum halide anew when said complex is assigned for reuse.

In the light of the drawbacks of the prior art as stated above, the present inventors have previously proposed a method of preparing polyolefin oils by employing a granular solid catalyst to be obtained by mixing an olefin in an amount of 1 mole or more and a ketone having 4 or more carbon atoms in an amount of 1.0 – 1.2 mole with 1 mole of an aluminum halide and making them react at a temperature of more than 60° C (cf. U.S. Pat. No. 3,953,361). This method has advantages such that it facilitates the recovery of catalyst after the reaction and the recovered catalyst can be reused as it is, but it still leaves room for improvement because the yield is in the range of about 70 – 80% and is not very high.

The present inventors have thereafter proposed, in U.S. Pat. No. 3,952,071, a method of preparing polyolefin oils which comprises polymerizing olefins having 6 or more carbon atoms in the presence of a mixture of a polyhydric alcohol derivative and an aluminum halide, said derivative being obtained by replacing the hydrogen atoms of all the hydroxyl groups of the polyhydric alcohol either by acyl groups exclusively or by acyl groups and alkyl groups, both of said groups having 1 – 20 carbon atoms.

With a view to developing a further improved method of polymerizing olefins which will not only facilitate the recovery of the polymerization catalyst after the reaction and render it possible to reuse the recovered catalyst but also produce polyolefin oils at a high yield, the present inventors have conducted a series of studies subsequent thereto. As a result, they have come to the finding that the employment of a mixture of ether derived from polyhydric alcohol and aluminum halide as catalyst in polymerization renders it possible to prepare polyolefin oils having a high viscosity index and containing no halogen at all at a high yield or more than 90% and facilitates separation of the catalyst from the reaction product, and moreover, the thus recovered catalyst, when reused as it is, renders it possible to maintain a high yield practically equivalent to that in the initial polymerization reaction.

SUMMARY OF THE INVENTION

The method of preparing polyolefin oils according to the present invention comprises polymerizing olefins having 6 or more carbon atoms in the presence of a mixture of (a) a polyhydric alcohol derivative obtained by replacing the hydrogen atoms of all the hydroxyl groups of the polyhydric alcohol by alkyl groups having 1 to 20 carbon atoms and (b) an aluminum halide in an amount of 0.7 to 2.8 moles per one ether bond possessed by said polyhydric alcohol derivative.

As the starting material olefin for use in the present invention, either of an alpha-olefin and an internal olefin having 6 or more carbon atoms is useful, and to be concrete, hexene-1, octene-1, 2-ethyl octene-1, tridecene-3, octadecene-1, octadecene-3, etc. are illustrative of the useful olefins. Also, mixture of these olefins can be used as the starting olefin.

The polyhydric alcohol derivative to constitute an ingredient of the polymerization catalyst for use in the method of the present invention means an ether obtained by replacing hydrogen atoms of all the hydroxyl groups of the polyhydric alcohol illustrated by ethylene glycol, glycerin, trimethylol propane, pentaerythritol, 1,2-propane diol, 1,5-pentane diol, 1,4-butane diol, 1,3-propane diol, diethylene glycol, triethylene glycol, tetraethylene glycol, etc., and to be concrete, it includes ethylene glycol methylethyl ether, ethylene glycol dimethyl ether, ethylene glycol diethyl ether, diethylene glycol methylethyl ether, diethylene glycol dimethyl ether, diethylene glycol diethyl ether, triethylene glycol methylethyl ether, triethylene glycol dimethyl ether, triethylene glycol diethyl ether, triethylene glycol dicapryl ether, propylene glycol methylethyl ether, pentaerythritol tetramethyl ether, 1,3-dimethoxypropane, 1,5-diethoxypentane, 1,4-dipropoxybutane, etc.

The other ingredient of the polymerization catalyst of the present invention is aluminum halide to be illustrated by aluminum fluoride, aluminum chloride, aluminum bromide and aluminum iodide, among which aluminum chloride is most desirable.

In the present invention, a mixture of the foregoing polyhydric alcohol derivative and aluminum halide is used as polymerization catalyst, and the mixing ratio of these ingredients of the catalyst constitutes an important factor. As to the amount of the aluminum halide to be employed, it is necessary to maintain it in the range of 0.7 – 2.8 moles per one ether bond of the polyhydric alcohol derivative; in the case where it is less than this range, smooth progress of the polymerization reaction cannot be expected and also the yield of polyolefin oil decreases extremely. On the other hand, the use of the aluminum halide in an amount of more than the above range is undesirable because the cationic polymerization reaction peculiar to aluminum halide will occur preferentially and also the catalyst recovered after the reaction will become unsuitable for reuse. The optimum amount of aluminum halide to be employed is in the range of 0.8 – 2.3 moles per one ether bond of said polyhydric alcohol derivative. In this connection, the amount of the aluminum halide to be employed is in the range of 0.1 – 12 mole %, preferably 0.5 – 8 mole %, based on the starting olefin.

In order to practice the method of the present invention, it is usual to dissolve a prescribed amount of the aluminum halide in the polyhydric alcohol derivative and then add the starting olefin to the resulting solution thereby to effect polymerization, but it also will do to disperse the polyhydric alcohol derivative together with the aluminum halide in an appropriate inactive solvent such as n-octane, olefin oligomer, etc. beforehand and then add the thus prepared dispersion to the starting olefin. The reaction temperature varies with the kind of the polyhydric alcohol derivative as well as aluminum halide employed, but it is usually in the range of 50° – 150° C. The polymerization reaction in the present invention is usually effected in the absence of solvent. But, a solvent may be used for the purpose of facilitating the control of the reaction temperature. The solvent for this purpose can be illustrated by n-pentane, iso-octane, trichloroethane, tetrafluoroethane, etc. The appropriate amount of the solvent for use in effecting the reaction is in the range of 25 – 200% (by volume) based on the starting olefin.

After completing the reaction, the polymerization catalyst is separated from the reacted mixture as set for below. If it is desired to remove the unreacted olefin and/or olefin dimer mixed in the polymerization product in order to obtain a refined polyolefin oil, it can be effected by distillation or extraction treatment. Further, if it is desired to improve the oxidation stability and/or thermal stability of the thus refined polyolefin oil, it can be easily effected by saturating double bonds remaining in the polyolefin oil by the use of a hydrogenation catalyst such as Raney nickel, nickel on kieselguhr, etc.

One of the advantages possessed by the present invention is that, because of the specific gravity of the polymerization catalyst in the reacted mixture after completion of the reaction being fairly greater than that of the fellow ingredients, the polymerization catalyst can be easily separated by merely leaving the reacted mixture standing still. Another advantage possessed by the present invention is that the separated and recovered polymerization catalyst can be reused as it is for polymerization of olefins as proved in Example 1 in the following, and even in the case where the recovered catalyst is thus reused, polyolefin oils having a viscosity index of 137 – 138 or thereabouts and containing no halogen at all can be obtained at a yield of more than 90% like in the case of using fresh catalyst.

The 'polyolefin oil containing no halogen at all' herein means a polyolefin oil having properties such that, when one and the same Raney nickel catalyst is repeatedly used for performing hydrogenation treatment 10 times, wherein each of said hydrogenation treatments comprises subjecting a polyolefin oil to hydrogenation for 3 hours in the presence of the Raney nickel catalyst in an amount of 3 wt.% based on the polyolefin oil under a hydrogen pressure of 10 Kg/cm$^2$ and a temperature of 150° C, separating the catalyst from the resulting hydrogenated oil thereafter and re-using the thus separated catalyst for the next hydrogenation treatment to be performed under the same condition as above, the bromine number of the hydrogenated oil obtained through the tenth hydrogenation treatment is less than 0.5.

In this connection, in the case where any halogen is contained in the polyolefin oil, deterioration of the catalytic efficiency of the catalyst is remarkable at the time of the hydrogenation treatment, so that it is infeasible to obtain a hydrogenated oil having the bromine number of less than 0.5 in said tenth hydrogenation treatment. It is further added for precaution's sake that in the present invention the measurement of the halogen content in the polyolefin oil has been conducted by an indirect means as above for there is available no apposite method of directly measuring said content at present.

As will be understood from the foregoing elucidation, the method of the present invention employing a mixture of a polyhydric alcohol derivative and an aluminum halide as polymerization catalyst not only facilitates separation of said polymerization catalyst from the reacted mixture but also renders it possible to use the thus recovered catalyst as it is repeatedly in polymerizing olefins. The polyolefin oils obtained by the method of the present invention has a high viscosity index and contains no halogen at all, so that they promise a wide range of use such as a high grade lubricant, e.g., gas turbine oil, engine oil, a variety of gear oils, grease base oil, etc. as well as a cosmetic base and a textile finishing agent.

DESCRIPTION OF THE PREFERRED EMBODIMENTS

EXAMPLE 1.

After putting polyhydric alcohol derivative of various kinds together with aluminum chloride in various amounts as shown in the following Table-1 in a 1 l glass autoclave with stirrer and elevating the temperature up to 100° C, by continuously stirring them for 3 hours, varieties of polymerization catalysts were prepared. Subsequently, by adding 600 g of octene-1 as the starting material olefin to each of the thus obtained catalyst dropwise, polymerization was effected at 120° C for 5 hours. After completing the reaction, the reacted mixture was left standing still thereby to separate the polymerization catalyst from the reaction product. Then, the catalytic efficiency of the thus separated catalyst was tested plural times by repeating the process of directly returning said catalyst to the foregoing autoclave and reusing it in polymerization of the starting olefin through the same procedure as above.

In the repeated test, the polymerization product obtained in the first, second and tenth polymerization was respectively subjected to distillation to separate the unreacted olefin and olefin dimer therefrom, and the yield, viscosity (kinematic viscosity at 100° F) and viscosity index (VIE) of each product were evaluated. Also, the apparatus used in said distillation was examined to confirm whether there was any corrosion thereof. Furthermore, hydrogenation treatment of the same polyolefin oil as that refined through the above distillation was repeated 10 times by repeatedly using Raney nickel exclusively, and the bromine number of the respective hydrogenated oils obtained in the first and tenth hydrogenation treatment was measured. The results were as shown in the following Table-2.

Table 1

| Run No. | (a) Polyhydric alcohol derivative | (g) | (b) AlCl$_3$ (g) | Molar ratio of (b) to (a) |
|---|---|---|---|---|
| 1 | ethylene glycol diethyl ether | 5.30 | 12 | 2.0 |
| 2 | " | 10.6 | " | 1.0 |
| 3 | " | 1.77 | " | 6.0 |
| 4 | " | 3.79 | " | 2.8 |
| 5 | " | 10.6 | " | 2.0 |
| 6 | " | 5.3 | 24 | " |
| 7 | " | 5.3 | 12 | " |
| 8 | ethylene glycol dimethyl ether | 4.04 | " | " |
| 9 | 1,2-dimethoxypropane | 4.72 | " | " |
| 10 | ethylene glycol dibutyl ether | 7.83 | " | " |
| 11 | pentaerythritol tetramethyl ether | 4.32 | " | 4.0 |
| 12 | diethylene glycol diethyl ether | 4.86 | " | 3.0 |

(Remarks)
1. Run No. 2 and No. 3 are runs for reference purpose.
2. The starting material olefin in Run No. 7 was a mixture composed of α-olefins having 6, 8 and 10 carbon atoms, respectively, at the molar ratio of 1:1:1.

Table 2

| | | 1st polymerization | | | |
|---|---|---|---|---|---|
| Run No. | Yield (%) | Viscosity (centistoke) | Viscosity index (VIE) | Occurrence of corrosion | Bromine number of hydrogenated oil |
| | | | | | 1st hydrogenation / 10th hydrogenation |
| 1 | 96.8 | 54.3 | 138 | nil | 0.3 / 0.3 |
| 2 | 32.1 | 31.6 | 130 | " | 0.3 / 0.3 |
| 3 | 97.2 | 61.4 | 126 | some | 3.4 / (cf. Remarks) |
| 4 | 94.3 | 32.4 | 137 | nil | 0.3 / 0.3 |
| 5 | 97.2 | 60.0 | 138 | " | 0.3 / 0.3 |
| 6 | 93.8 | 40.0 | 137 | " | 0.3 / 0.3 |
| 7 | 95.3 | 51.2 | 137 | " | 0.3 / 0.3 |
| 8 | 94.3 | 46.3 | 137 | " | 0.3 / 0.3 |
| 9 | 95.0 | 59.3 | 138 | " | 0.3 / 0.3 |
| 10 | 94.0 | 69.8 | 137 | " | 0.3 / 0.3 |
| 11 | 93.0 | 46.3 | 138 | " | 0.3 / 0.3 |
| 12 | 96.5 | 50.2 | 137 | " | 0.3 / 0.3 |

| | | 2nd polymerization | | | |
|---|---|---|---|---|---|
| Run No. | Yield (%) | Viscosity (centistoke) | Viscosity index (VIE) | Occurrence of corrosion | Bromine number of hydrogenated oil 1st / 10th hydrogenation |
| 1 | 95.8 | 53.8 | 139 | nil | 0.3 / 0.3 |
| 2, 3 | No reaction was observed in from 2nd polymerization onward. | | | | |
| 4 | 95.0 | 31.8 | 137 | nil | 0.3 / 0.3 |
| 5 | 97.2 | 60.8 | 138 | " | 0.3 / 0.3 |
| 6 | 94.0 | 40.7 | 137 | " | 0.3 / 0.3 |
| 7 | 95.0 | 52.0 | 137 | " | 0.3 / 0.3 |
| 8 | 94.6 | 45.9 | 137 | " | 0.3 / 0.3 |
| 9 | 95.5 | 58.7 | 138 | " | 0.3 / 0.3 |
| 10 | 94.5 | 68.9 | 137 | " | 0.3 / 0.3 |
| 11 | 93.6 | 45.9 | 138 | " | 0.3 / 0.3 |
| 12 | 96.0 | 50.1 | 137 | " | 0.3 / 0.3 |

Table 2-continued

| | | 10th polymerization | | | |
|---|---|---|---|---|---|
| Run No. | Yield (%) | Viscosity (centistoke) | Viscosity index (VIE) | Occurrence of corrosion | Bromine number of hydrogenated oil 1st / 10th hydrogenation |
| 1 | 96.4 | 54.0 | 138 | nil | 0.3 / 0.3 |
| 2, 3 | No reaction was observed. | | | | |
| 4 | 95.0 | 32.0 | 137 | nil | 0.3 / 0.3 |
| 5 | 97.0 | 61.0 | 138 | " | 0.3 / 0.3 |
| 6 | 94.1 | 40.1 | 137 | " | 0.3 / 0.3 |
| 7 | 96.0 | 51.9 | 137 | " | 0.3 / 0.3 |
| 8 | 94.0 | 45.0 | 137 | " | 0.3 / 0.3 |
| 9 | 95.8 | 58.6 | 138 | " | 0.3 / 0.3 |
| 10 | 95.0 | 69.1 | 137 | " | 0.3 / 0.3 |
| 11 | 94.0 | 46.1 | 138 | " | 0.3 / 0.3 |
| 12 | 96.0 | 50.0 | 137 | " | 0.3 / 0.3 |

(Remark)
1. Raney nickel was spoiled in the 1st hydrogenation treatment so that it was unqualified for hydrogenation of the polyolefin oil in the second hydrogenation treatment.

EXAMPLE 2.

By mixing 60.4 g of aluminum chloride with 26.7 g of ethylene glycol diethyl ether within a 500 ml glass autoclave and stirring the resulting mixture for 1 hour at a temperature of 100° C, a catalyst was prepared. Subsequently, by introducing this catalyst into a 5 l autoclave-type reactor at a rate of 0.6 g/min. concurrently with octene-1 introduced into the same reactor at a rate of 30 cc/min., polymerization was effected at a temperature of 120° C. After the lapse of 120 minutes subsequent to starting said introduction, the reaction mixture was drawn at a rate of 30 cc/min. and introduced into a catalyst separation tank wherein said reaction mixture was separated into a polymer phase and a catalyst phase. This catalyst phase was returned to the foregoing autoclave-type reactor to serve for polymerization of octene-1 again, whereby a continuous test was conducted.

In this continuous test, when the polymer phase obtained from the catalyst separation tank in the first place was measured with respect to the yield, viscosity and viscosity index of the polyolefin oil by applying the same procedure as that in Example 1, the yield was 95%, the kinematic viscosity at 100° F was 42.8 centistokes and the viscosity index was 138, and said polyolefin oil proved to contain no halogen at all. When the polymer phase obtained 24 hours after obtaining the foregoing first batch of polymer phase was subjected to the same measurement as above, the result showed no substantial difference from the result of the previous measurement with respect to the content of halogen, the yield, the viscosity and the viscosity index.

This result attests to that the method of the present invention is suitable for continuous polymerization process as well.

Reference Example.

By employing the non-volatile residue obtained from thermal cracking of diethyl ether aluminum chloride [(AlCl$_3$ (OC$_2$H$_5$)] at 150° C as polymerization catalyst, octene-1 was polymerized at a temperature of 155° C. After completing the reaction, the polymerization catalyst was separated from the reacted mixture, and the thus obtained polymerization product was subjected to distillation so as to separate unreacted olefin and olefin dimer therefrom, whereby a polyolefin oil was obtained. On this occasion, there was observed the occurrence of corrosion of the distillation apparatus attributable to halogen.

Next, when the yield, viscosity and viscosity index of the thus obtained polyolefin oil were measured, the yield was 41.4%, the kinematic viscosity of 100° F. was 13.44, and the viscosity index (VIE) was 84. When this polyolefin oil was subjected to hydrogenation treatment by employing Raney nickel, there was obtained a hydrogenated oil with bromine number of 0.3, but the Raney nickel used in said hydrogenation treatment was no longer qualified for reuse. Besides, when the foregoing polymerization catalyst separated from the reacted mixture was employed in polymerizing octene-1 again, no reaction was effected thereby.

What is claimed is:

1. A method of preparing a polyolefin oil comprising polymerizing an olefin having 6 or more carbon atoms at a temperature in the range of from 50 to 150° C in the presence of a catalyst mixture consisting of a polyhydric alcohol derivative and an aluminum halide, said derivative being obtained by replacing hydrogen atoms of all the hydroxyl groups of the polyhydric alcohol by alkyl groups having 1 to 20 carbon atoms.

2. A method according to claim 1, wherein said polyhydric alcohol derivative is selected from the group consisting of ethylene glycol methylethyl ether, ethylene glycol dimethyl ether, ethylene glycol diethyl ether, diethylene glycol methylethyl ether, diethylene glycol dimethyl ether, diethylene glycol diethyl ether, triethylene glycol methylethyl ether, triethylene glycol dimethyl ether, triethylene glycol diethyl ether, triethylene glycol dicapryl ether, propylene glycol methylethyl ether, pentaerythritol methylethyl ether, 1,3-dimethoxypropane, 1,5-diethoxypentane and 1,4-dipropoxybutane.

3. A method according to claim 1, wherein said aluminum halide is aluminum chloride.

4. A method according to claim 1, wherein the amount of aluminum halide to be contained in said catalyst mixture is in the range of from 0.7 to 2.8 moles per 1 ether bond of said polyhydric alcohol derivative and in the range of from 0.1 to 12 mole % based on said olefin.

5. A method according to claim 1, wherein said aluminum halide is dissolved in said polyhydric alcohol derivative and thereafter said olefin is added to the resulting catalyst solution.

6. A method according to claim 1, wherein said polymerization is effected in a solvent selected from the group consisting of n-pentane, iso-octane, trichloroethane and tetrafluoroethane in an amount of 25 to 200% by volume, based on the olefin.

* * * * *